(12) United States Patent
Coakley

(10) Patent No.: US 9,999,951 B2
(45) Date of Patent: *Jun. 19, 2018

(54) COUPLING MEMBERS AND PIPE MACHINING APPARATUSES INCLUDING COUPLING MEMBERS

(71) Applicant: Illinois Tool Works Inc., Glenview, IL (US)

(72) Inventor: Roy C. Coakley, Northlake, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/187,903

(22) Filed: Jun. 21, 2016

(65) Prior Publication Data
US 2016/0297014 A1 Oct. 13, 2016

Related U.S. Application Data

(63) Continuation of application No. 13/795,966, filed on Mar. 12, 2013, now Pat. No. 9,475,160.
(Continued)

(51) Int. Cl.
*B23Q 1/25* (2006.01)
*B26D 7/26* (2006.01)
(Continued)

(52) U.S. Cl.
CPC .................. *B23Q 1/25* (2013.01); *B23B 3/26* (2013.01); *B23B 5/163* (2013.01); *B23D 21/04* (2013.01);
(Continued)

(58) Field of Classification Search
CPC .. B23Q 1/25; B23B 3/26; B23B 5/163; B23B 2210/08; B23B 2240/04; B23B 2270/08; B23B 5/10; B23D 45/126; B26D 7/2614
(Continued)

(56) References Cited

U.S. PATENT DOCUMENTS

| 1,140,208 A | 5/1915 | Taylor |
| 1,886,082 A | 11/1932 | Chapman |

(Continued)

FOREIGN PATENT DOCUMENTS

| CN | 85102879 A | 1/1986 |
| CN | 87101953 A | 9/1988 |

(Continued)

OTHER PUBLICATIONS

International Search Report and Written Opinion for International Patent Application No. PCT/US2013/063023 dated Jun. 2, 2014, 16 pages.

(Continued)

*Primary Examiner* — Alan Snyder
(74) *Attorney, Agent, or Firm* — Klintworth & Rozenblat IP LLP

(57) ABSTRACT

Coupling members and pipe machining apparatuses including coupling members are provided. In one aspect, a coupling member includes a shaft and an engagement member defining a cavity there through and including a projection. The shaft is at least partially positioned within the cavity and extends through the cavity, and the shaft is adapted to rotate relative to the engagement member. The coupling member also includes a plunger at least partially positioned within the cavity and moveable relative to the engagement member, and further includes a biasing member at least partially positioned within the cavity between the plunger and the engagement member.

7 Claims, 7 Drawing Sheets

Related U.S. Application Data

(60) Provisional application No. 61/709,742, filed on Oct. 4, 2012.

(51) Int. Cl.
| | | |
|---|---|---|
| *F16M 13/02* | (2006.01) | |
| *B23B 3/26* | (2006.01) | |
| *B23B 5/16* | (2006.01) | |
| *B25B 5/10* | (2006.01) | |
| *B23D 45/12* | (2006.01) | |
| *B23D 21/04* | (2006.01) | |

(52) U.S. Cl.
CPC .............. *B23D 45/126* (2013.01); *B25B 5/10* (2013.01); *B26D 7/2614* (2013.01); *F16M 13/02* (2013.01); *Y10T 83/68* (2015.04)

(58) Field of Classification Search
USPC ........................... 411/82, 999; 294/251, 212
See application file for complete search history.

(56) References Cited

U.S. PATENT DOCUMENTS

| | | |
|---|---|---|
| 2,358,741 A | 9/1944 | Shelby |
| 2,364,963 A | 12/1944 | Elliott |
| 2,635,270 A | 4/1953 | Dawson |
| 2,798,380 A | 7/1957 | Bennett |
| 2,931,659 A | 4/1960 | Novkov |
| 3,253,336 A | 5/1966 | Brown |
| 3,431,646 A | 3/1969 | Young |
| 3,732,758 A | 5/1973 | Rinaldo |
| 3,942,248 A | 3/1976 | Sherer |
| 4,112,794 A | 9/1978 | Franks |
| 4,318,391 A | 3/1982 | Wachs et al. |
| 4,366,994 A | 1/1983 | Yoshioka |
| 4,397,487 A | 8/1983 | Guttman |
| 4,411,178 A | 10/1983 | Wachs |
| 4,421,441 A | 12/1983 | Hirose |
| 4,483,223 A | 11/1984 | Nall et al. |
| 4,490,909 A | 1/1985 | Wachs et al. |
| 4,493,150 A | 1/1985 | Garcia |
| 4,543,861 A | 10/1985 | Kwech et al. |
| 4,608,755 A | 9/1986 | Braasch |
| 4,637,285 A | 1/1987 | Mizoguchi |
| 4,655,108 A | 4/1987 | Galos |
| 4,677,884 A | 7/1987 | Kwech et al. |
| 4,739,685 A | 4/1988 | Ricci |
| 4,754,672 A | 7/1988 | VanderPol |
| 4,762,038 A | 8/1988 | Olson |
| 4,770,074 A | 9/1988 | Kwech |
| 4,791,842 A | 12/1988 | Olson |
| 4,813,314 A | 3/1989 | Kwech |
| 4,829,860 A | 5/1989 | VanderPol |
| 4,880,340 A | 11/1989 | Taki et al. |
| 4,939,964 A | 7/1990 | Ricci |
| 5,002,440 A | 3/1991 | Tamaoki et al. |
| 5,013,015 A | 5/1991 | Fatheree |
| 5,050,291 A | 9/1991 | Gilmore |
| 5,054,342 A | 10/1991 | Swiatowy et al. |
| 5,070,600 A | 12/1991 | Brew et al. |
| 5,199,928 A | 6/1993 | Gress et al. |
| 5,361,659 A | 11/1994 | Hanson |
| 5,368,399 A | 11/1994 | Tremblay |
| 5,549,024 A | 8/1996 | Ricci et al. |
| 5,603,250 A | 2/1997 | Robinson |
| 5,609,081 A | 3/1997 | Lin |
| 5,775,188 A | 7/1998 | Strait |
| 5,894,772 A | 4/1999 | Nodar |
| 5,941,145 A | 8/1999 | Marshall |
| 5,943,927 A | 8/1999 | Hanson |
| 5,954,462 A | 9/1999 | Way et al. |
| 6,065,378 A | 5/2000 | Ricci |
| 6,227,577 B1 | 5/2001 | Ikeda et al. |
| 6,257,110 B1 | 7/2001 | Ricci et al. |
| 6,615,696 B2 | 9/2003 | Ricci |
| 7,000,510 B1 | 2/2006 | Place |
| 7,383,758 B2 | 6/2008 | Place |
| 8,534,170 B2 | 9/2013 | Arnemann |
| 9,050,669 B2 | 6/2015 | Coakley |
| 2004/0234352 A1 | 11/2004 | Vanderpol |
| 2005/0132851 A1 | 6/2005 | Place |
| 2009/0191040 A1 | 7/2009 | Liu et al. |
| 2010/0062887 A1 | 3/2010 | Bodensteiner et al. |
| 2010/0162860 A1 | 7/2010 | Hall et al. |
| 2014/0190327 A1 | 7/2014 | Pierce |

FOREIGN PATENT DOCUMENTS

| | | |
|---|---|---|
| CN | 2109276 U | 7/1992 |
| CN | 2254385 Y | 5/1997 |
| CN | 2274107 Y | 2/1998 |
| CN | 201482987 U | 5/2010 |
| DE | 900042 C | 12/1953 |
| DE | 2439852 A | 4/1976 |
| DE | 3603618 C1 | 10/1987 |
| DE | 4240637 C1 | 6/1994 |
| DE | 10020393 A1 | 2/2001 |
| DE | 10 2009 005983 A1 | 7/2010 |
| EP | 0819501 A1 | 1/1998 |
| GB | 2242850 A | 10/1991 |
| WO | 2010077349 A1 | 7/2010 |
| WO | 2012/071419 A1 | 5/2012 |
| WO | 012071419 A1 | 5/2012 |
| WO | 2014055610 A1 | 4/2014 |

OTHER PUBLICATIONS

International Search Report and Written Opinion for PCT/US2013/062999 dated Jan. 29, 2014, 12 pages.
International Search Report and Written Opinion for PCT/US2013/062987 dated Feb. 20, 2014, 11 pages.
HST2121, "H&S Tool Clamshell.mpg," Dec. 22, 2009, Published on YouTube, https://www.youtube.com/watch?v=Okfh-ODTj-8.
International Search Report and Written Opinion for PCT/US2015/056015 dated Mar. 31, 2016, 19 pages.
International Search Report and Written Opinion for PCT/US2015/056006 dated Mar. 31, 2016, 17 pages.
International Search Report and Written Opinion for PCT/US2013/063007, dated Jan. 22, 2014, 14 pages.
Communication pursuant to Rule 164(2)(b) and Article 94(3) EPC issued for EP 13 779 984.7—1019 dated Jan. 16, 018, 6 pages.

COUPLING MEMBERS AND PIPE MACHINING APPARATUSES INCLUDING COUPLING MEMBERS

RELATED APPLICATIONS

The present application is a continuation of co-pending U.S. Non-Provisional patent application Ser. No. 13/795,966, filed Mar. 12, 2013, which claims the benefit of U.S. Provisional Patent Application No. 61/709,742, filed Oct. 4, 2012, all of which are incorporated by reference herein.

FIELD OF THE INVENTION

The present disclosure generally relates to pipe machining apparatuses and, more particularly, to pipe machining apparatuses for machining large diameter pipes.

BACKGROUND

A variety of different coupling members exist for use in a variety of different environments and applications. One exemplary application in which coupling members are required is pipe machining apparatuses such pipe machining apparatuses may perform various machining processes on a pipe. One such process includes cutting pipes. Large diameter pipes may be cut with a split frame pipe machining apparatus, which includes two frame halves that surround the pipe from respective sides and are coupled together around the pipe. Such a pipe cutter includes a tool or cutting device that encircles the pipe and moves toward the pipe in small increments during the cutting process in order to slowly cut into the pipe. Eventually, after many small increments of adjustment toward the pipe, the pipe will be completely cut.

Such pipe machining apparatuses include tool supports adapted to support the cutting tools. Such tool supports are secured in place by a multitude of threaded fasteners. Each tool support must be held in place with one hand while the other hand commences tightening of the multitude of fasteners. Several threaded fasteners must be sufficiently tightened in order for the operator to release the tool support with the other hand. Moreover, to sufficiently tighten the fasteners, the fastener must be rotated many times. Thus, the process of securing the tool supports in place is a cumbersome task requiring significant time and effort to achieve.

Additionally, coupling members in other applications are also cumbersome to use. Furthermore, coupling members may be ineffective at performing the desired coupling and/or coupling members may easily become uncoupled when coupling is desired.

Coupling members also have a limited use. That is, some coupling members are made for one specific application or environment, and such coupling members cannot be utilized in other applications or environments, thereby limiting the usability of the coupling members.

It would therefore be desirable to provide a coupling member that is easy to use, effective at providing the desired coupling, and useable in a wide variety of environments.

SUMMARY

The present disclosure is defined by the following claims, and nothing in this section should be taken as a limitation on those claims.

In one aspect, a pipe machining apparatus is provided and includes a frame, a tool carrier coupled to the frame and movable relative to the frame, a tool support coupled to the tool carrier and adapted to support a tool for movement with the tool carrier relative to the frame, and a coupling member adapted to couple the tool support to the tool carrier. The coupling member includes a shaft adapted to engage the tool carrier and an engagement member coupled to the shaft and rotatable relative to the shaft between a coupled condition, in which the engagement member couples the tool support to the tool carrier, and an uncoupled condition, in which the engagement member does not couple the tool support to the tool carrier.

In another aspect, a coupling member is provided and includes a shaft and an engagement member defining a cavity there through and including a projection. The shaft is at least partially positioned within the cavity and extends through the cavity. The shaft is adapted to rotate relative to the engagement member. The coupling member also includes a plunger at least partially positioned within the cavity and moveable relative to the engagement member, and a biasing member at least partially positioned within the cavity between the plunger and the engagement member.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
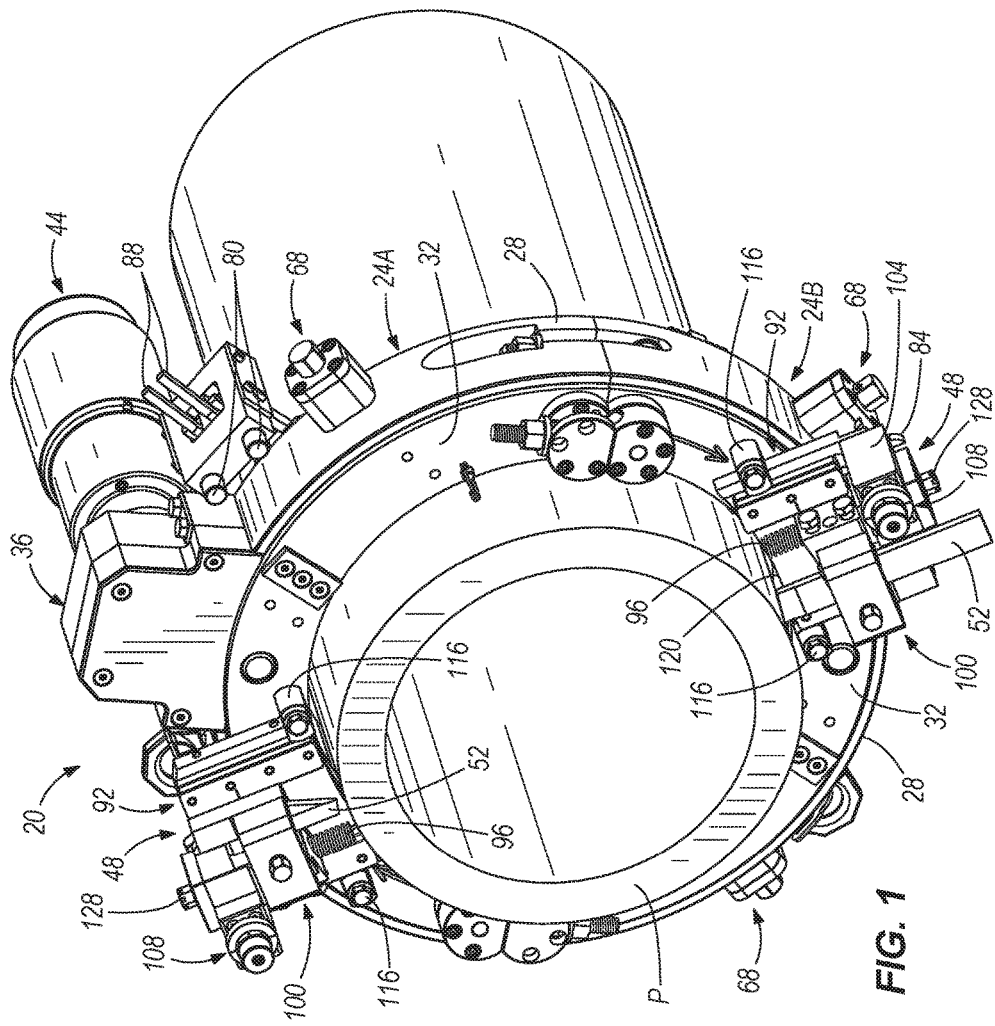
FIG. 1 is a top front perspective view of an exemplary environment in which an exemplary coupling member may be utilized, the exemplary environment comprises an exemplary pipe machining apparatus coupled to a pipe, in accordance with one embodiment.
Figure 2:
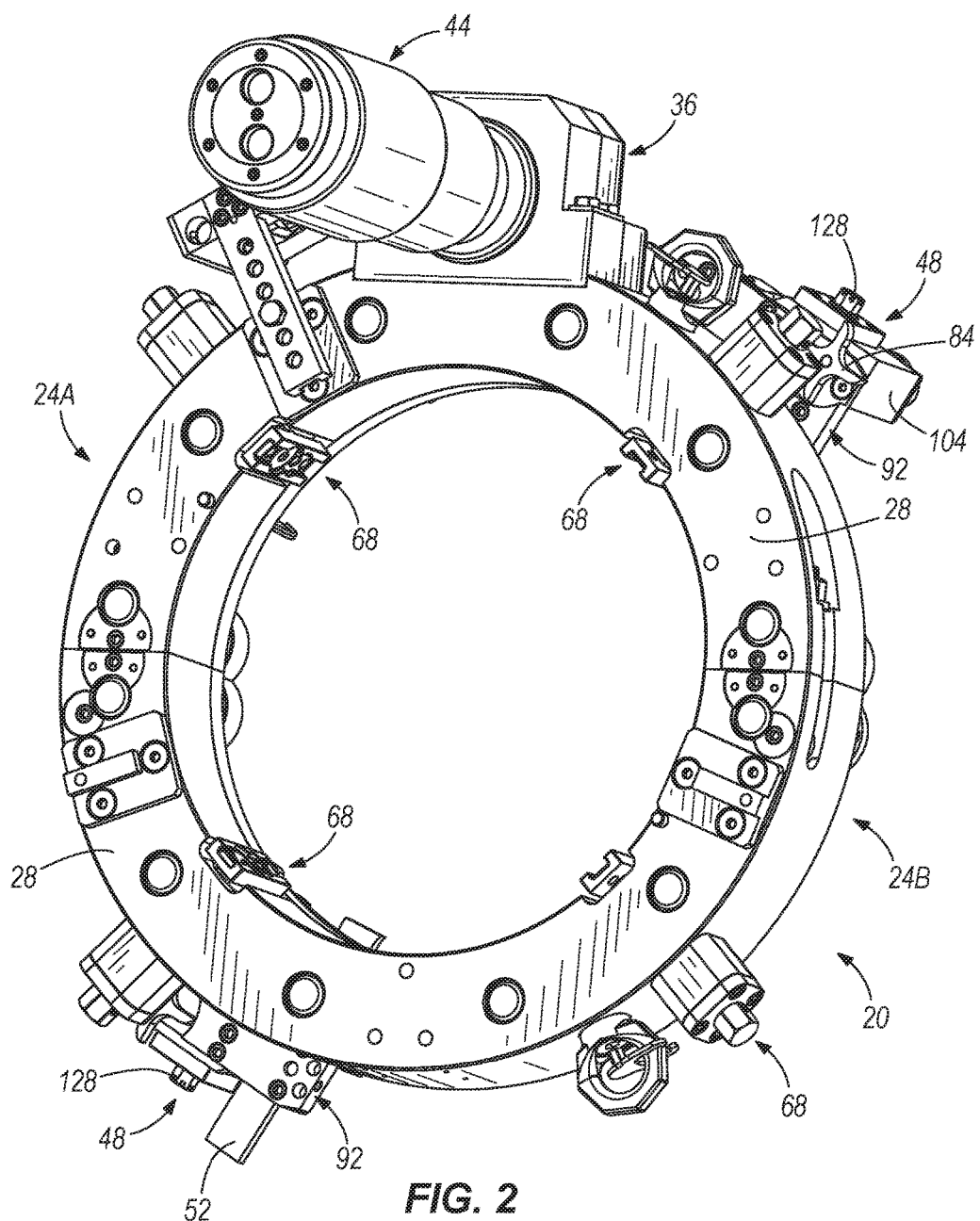
FIG. 2 is a bottom rear perspective view of the pipe machining apparatus illustrated in FIG. 1, in accordance with one embodiment.
Figure 3:
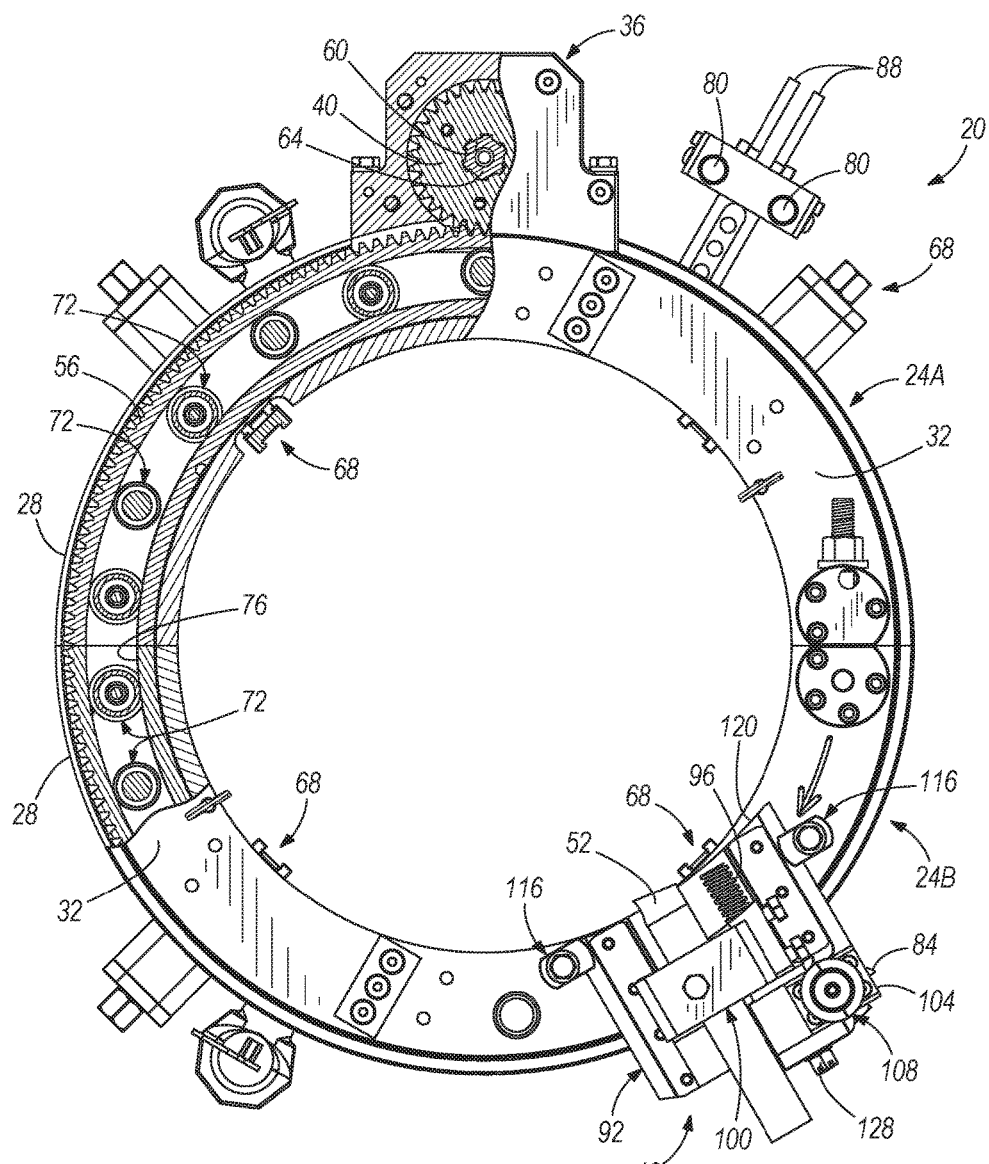
FIG. 3 is a front view of the pipe machining apparatus illustrated in FIG. 1 with a portion thereof broken away to show internal components of the pipe machining apparatus, in accordance with one embodiment.

With reference to FIGS. 1-3, there is shown one exemplary embodiment of a pipe machining apparatus 20 adapted to machine pipes P of varying diameters. In some exemplary embodiments, the apparatus 20 completely cuts through pipes P. In other exemplary embodiments, the apparatus 20 prepares an end of a pipe P for coupling to another pipe. In still other exemplary embodiments, the apparatus 20 both completely cuts and prepares a pipe P for coupling to another pipe.

In the illustrated exemplary embodiment, pipe machining apparatus 20 is formed of two joined-together semicircular sections 24A, 24B and includes a frame 28 and a tool carrier 32. The two sections 24A, 24B together comprise the frame 28 and the tool carrier 32 such that a first portion of the frame 28 and a first portion of the tool carrier 32 is included in one section 24A and a second portion of the frame 28 and a second portion of the tool carrier 32 is included in the other section 24B. The frame 28 has a column 36 extending outwardly of the two semicircular sections 24A, 24B and houses a pinion gear 40 adapted to couple with a suitable drive motor 44, such as an air motor with suitable gear reduction means. The frame 28 is adapted to couple and be fixed relative to a pipe P, and the tool carrier 32 is rotatable relative to the fixed frame 28 and the pipe P. The air motor 44 is adapted to rotate the tool carrier 32 relative to the frame 28 through a gear train in the column 36. The tool carrier 32 has a circular gear rack 56 for meshing with the pinion gear 40 rotatably mounted in column 36. The pinion gear 40 has an opening 60 provided with a polygonal perimeter for receiving a complementary shaped drive head 64 of drive motor 44. Therefore, it can be seen that drive motor 44 is adapted to rotate tool carrier 32 relative to the frame 28 through a gear train provided by pinion gear 40 in column 36 and circular gear rack 56 on the tool carrier 32.

The rotatable tool carrier 32 includes one or more tool supports 48 (two tool supports 48 shown in the illustrated exemplary embodiment), which support tools 52 for performing a cutting or machining operation on the pipe P as the tools 52 rotate circumferentially about the pipe P. The tool supports 48 are coupled to the tool carrier 32 by a plurality of coupling members 116 (described in more detail below). The machining operation performed by the tool(s) 52 may form a straight edge perpendicular to a longitudinal extent of the pipe P, a bevel on an end of the pipe P that is transverse to the longitudinal extent of the pipe P and at an angle other than ninety degrees, or an edge of a pipe P having any angle.

The apparatus 20 further includes four adjustable clamp members or coupling members 68 engageable with an exterior of the pipe P and having suitable adjustability to couple and concentrically locate the apparatus 20 to the pipe P.

As best seen in FIG. 3, tool carrier 32 is rotatably mounted on and supported by frame 28 by a plurality of roller bearings 72. The roller bearings 72 ride in a circular bearing race 76 on the interior of tool carrier 32.

A plurality of projections 80 are adjustably movable into and out of a path of an advancement member 84 coupled to each tool support 48 to advance the tool 52 toward the pipe P. In the illustrated exemplary embodiment, the apparatus 20 includes a total of two projections 80 for engaging the advancement members 84, however, the apparatus 20 may include any number of projections 80. Each projection 80 is coupled to a lever 88 that may be actuated by a user to selectively move the projection 80 into and out of the path of the advancement members 84.

With continued reference to FIGS. 1 and 3, and further reference to FIGS. 4-10, one of the tool supports 48 and a plurality of coupling members 116 for coupling the tool support 48 to the tool carrier 32 are illustrated in more detail.

The tool support 48 includes a base 92, a feed screw 96 rotatably coupled to the base 92, a tool clamp 100 adapted to support a tool 52 and movable along the feed screw 96, a worm gear housing 104 coupled to the base 92, a worm gear assembly 108 supported by and at least partially positioned within the worm gear housing 104, and the advancement member 84 coupled to the worm gear assembly 108.

The tool support 48 is coupled to the tool carrier 32 by one or more coupling members 116 (two shown in the exemplary illustrated embodiment) and is adjustable relative to the pipe P to bring an arcuate edge 120 of the base 92 into contact with or in close proximity to an outer periphery of the pipe P. The tool clamp 100 is adapted to support a tool 52 and is movable along the feed screw 96 toward and away from the pipe P (depending on the direction of feed screw rotation). The feed screw 96 can have a variety of different tooth shapes, sizes, pitches, and configurations in order to provide a desired amount of tool movement during use of the apparatus 20. The advancement member 84 is coupled to the worm gear assembly 108 and the worm gear assembly 108 is coupled to the feed screw 96 such that engagement of the advancement member 84 with projections 80 causes the advancement member 84 to rotate, thereby causing the worm gear assembly 108 to rotate, which rotates the feed screw and ultimately moves the tool clamp 100 and tool 52 along the feed screw 96 in the desired direction. A tool coupling 128 such as, for example, a hex nut, is coupled to an end of the feed screw 96, thereby providing a location where a tool may couple to and rotate the feed screw 96 as desired.

The coupling member 116 includes a shaft 132, an engagement member 136, a first resilient member 140, a biasing member 144, a plunger 148, and a second resilient member 152. The shaft 132 includes an enlarged head 156 near a first end thereof that includes a tool coupling 160 adapted to be engaged by a tool for rotation of the shaft 132. In the illustrated exemplary embodiment, the tool coupling 160 is a hex-head type coupling. Alternatively, the tool coupling 160 may be any type of tool coupling such as, for example, a flat-head or Phillips-head screw driver coupling, an allen wrench coupling (hex key coupling), or any other type of coupling. A bottom surface 164 of the enlarged head 156 engages a top surface 168 of the engagement member 136. The shaft 132 also defines a recess 172 therein for receiving the first resilient member 140. The recess 172 has an appropriate depth such that the first resilient member 140 protrudes beyond the shaft 132 and engages an interior surface of a cavity 180 defined in the engagement member 136. A second end 184 of the shaft 132 is threaded and is adapted to threadably engage a complementarily threaded opening in the tool carrier 32.

With particular reference to FIGS. 6-10, the engagement member 136 defines a cavity 180 there through that includes a first portion 188 adapted to receive a portion of the shaft 132 and the first resilient member 140 and a second portion 192 adapted to receive a portion of the shaft 132, the biasing member 144, the plunger 148, and the second resilient member 152. The first portion 188 is smaller in diameter than the second portion 192 and a shoulder 194 is provided between the first and second portions 188, 192. The first resilient member 140 engages a surface 176 of the first portion 188 of the cavity 180 and the second resilient member 152 engages a surface 196 of the second portion 192. The shaft 132 extends completely through the cavity 180 with the bottom surface 164 of the enlarged head 156 engaging the top surface 168 of the engagement member 136 and the threaded end 184 of the shaft 132 protruding below a bottom surface 198 of the engagement member 136. The engagement member 136 also includes a projection 200 having a bottom surface 204 adapted to engage a top surface 208 of the base 92 of the tool support 48 for securing the tool support 48 in place relative to the tool carrier 32. Additionally, the engagement member 136 includes a side surface 212 oriented generally underneath the projection 200 and adapted to engage a side surface 216 of the base 92 of the tool support 48. The side surface 212 comprises a first stop member or first generally straight or flat portion 220, a second stop member or second generally straight or flat portion 224, and an arcuate portion 228 between the first and second stop members 220, 224. Further, the engagement member 136 includes a toe or protrusion 232 extending from the bottom surface 198 of the engagement member 136 and adapted to engage the tool carrier 32. The inclusion of the protrusion 232 provides the engagement member 136 with coupling characteristics similar to that of a toe clamp.

Figure 9:
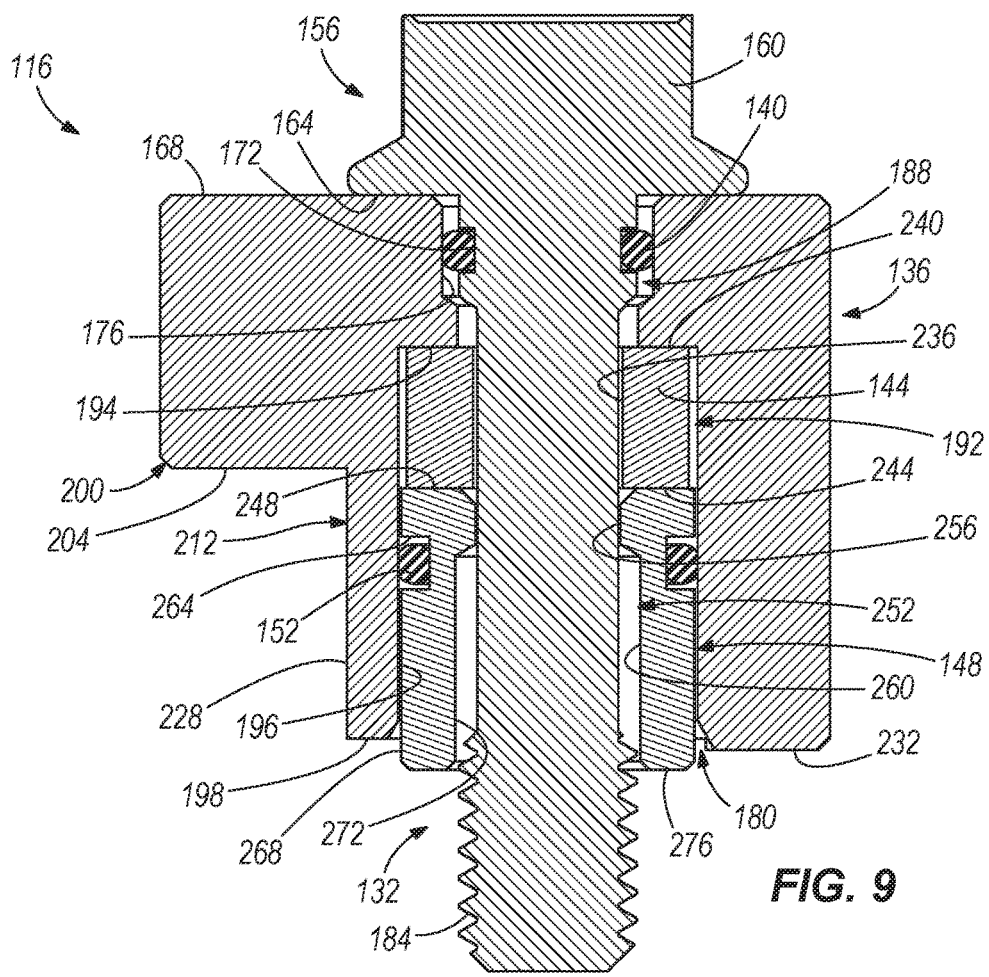
FIG. 9 is a cross-sectional view taken along line 9-9 in FIG. 8 of the coupling member, in accordance with one embodiment.
Figure 10:
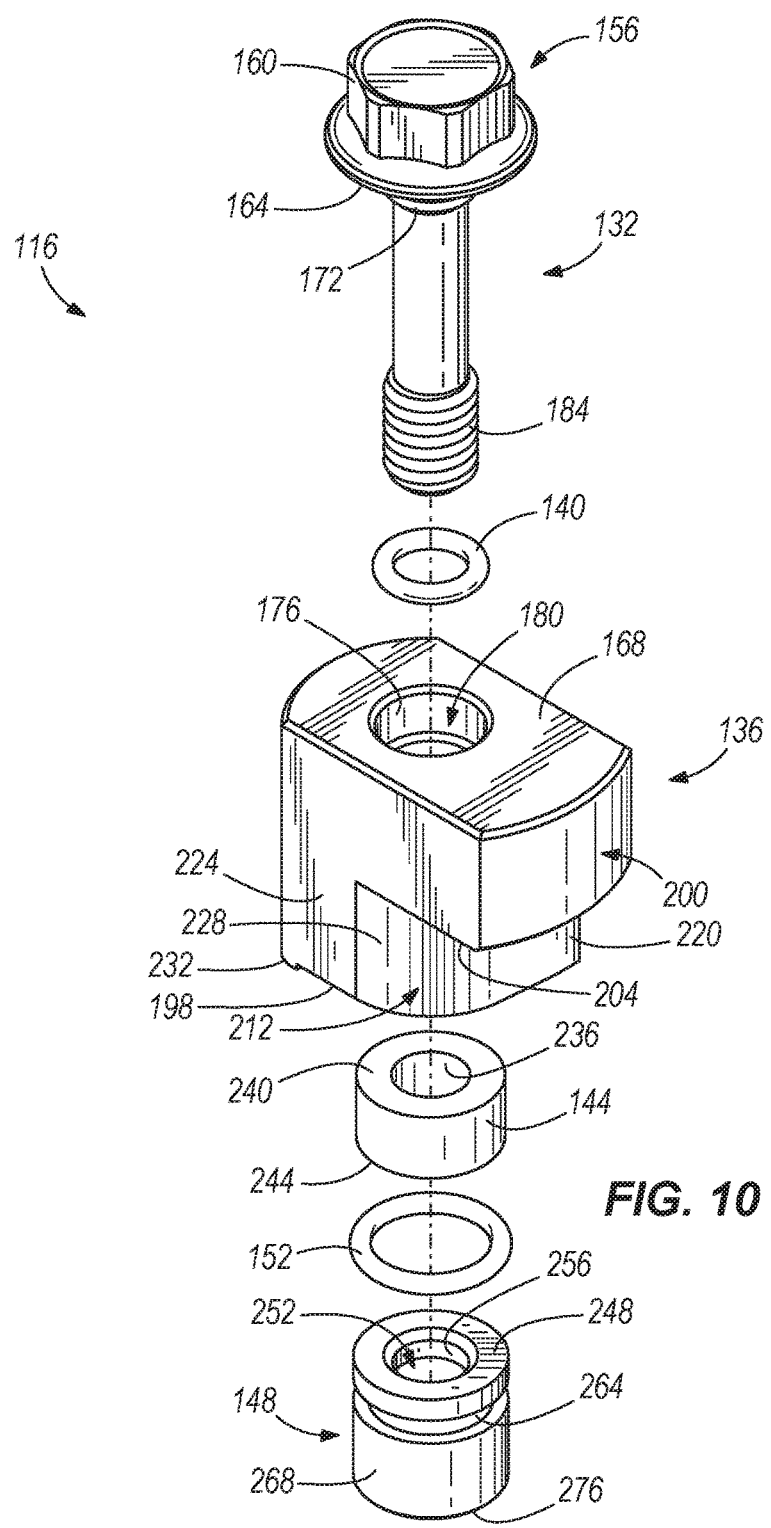
FIG. 10 is an exploded view of the coupling member shown in FIG. 6, in accordance with one embodiment.

With particular reference to FIGS. 9 and 10, the biasing member 144 defines an aperture 236 there through and is positioned in the second portion 192 of the cavity 180. A top surface 240 of the biasing member 144 engages the shoulder 194 of the cavity 180 and a bottom surface 244 of the biasing member 144 engages a top surface 248 of the plunger 148. The shaft 132 extends through the aperture 236 defined in the biasing member 144. In some exemplary embodiments, the biasing member 144 may be a urethane spring. In other exemplary embodiments, the biasing member 144 may be any type of biasing member such as, for example, a coil spring, leaf spring, disc spring, resilient member, etc.

Referring now to FIGS. 7-10, the plunger 148 defines a cavity 252 there through that includes a first portion 256 and a second portion 260 with the first portion 256 having a smaller diameter than the second portion 260. The shaft 132 extends through the cavity 252 and the first portion 256 is sized to provide little clearance between the shaft 132 and the first portion 256. The second portion 260 is wider than the first portion 256 and is sized sufficiently large to provide clearance between threads on the threaded end 184 of the shaft 132 and the cavity 252. The plunger 148 also defines a recess 264 in an exterior surface 268 thereof for receiving the second resilient member 152 therein. The recess 264 has an appropriate depth such that the second resilient member 152 protrudes beyond the exterior surface 268 of the plunger 148 and engages an interior surface 196 of the second portion 192 of the cavity 180. The plunger 148 extends out of the cavity 180, protrudes below the bottom surface 198 of the engagement member 136, and a bottom surface 276 of the plunger 148 is adapted to engage the tool carrier 32.

Figure 4:
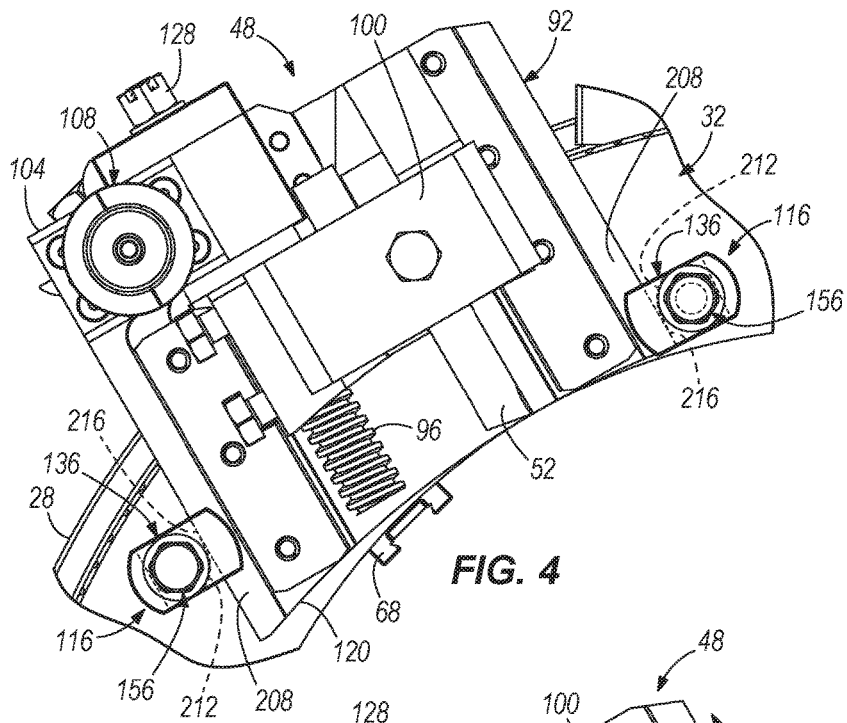
FIG. 4 is an enlarged front view of an exemplary tool support and a plurality of exemplary coupling members shown in FIG. 1 with the coupling members illustrated in a coupled condition, in accordance with one embodiment.
Figure 5:
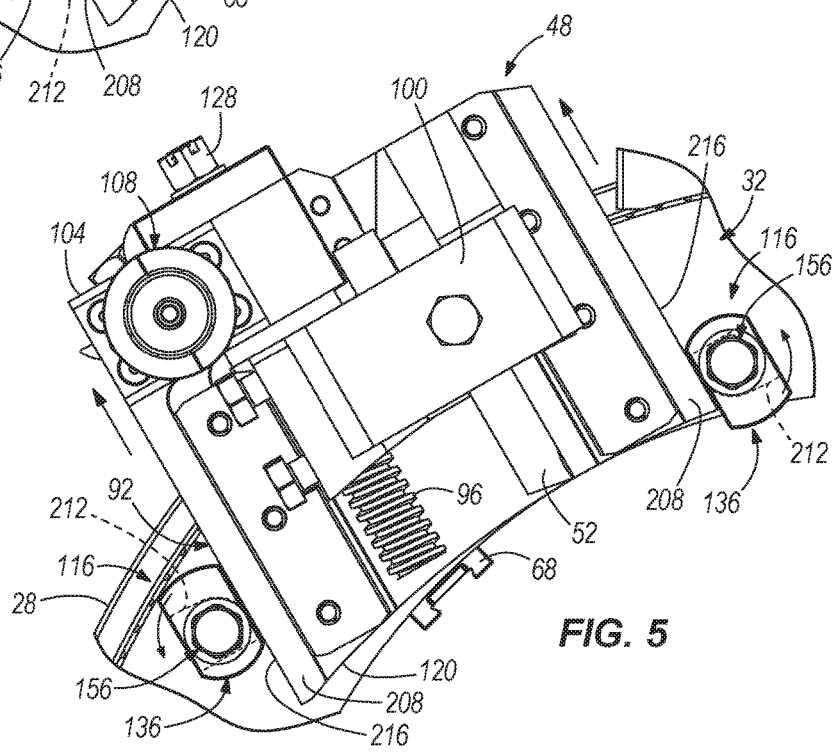
FIG. 5 is an enlarged front view of the tool support and the plurality of coupling members shown in FIG. 1 with the coupling members illustrated in an uncoupled condition, in accordance with one embodiment.
Figure 6:
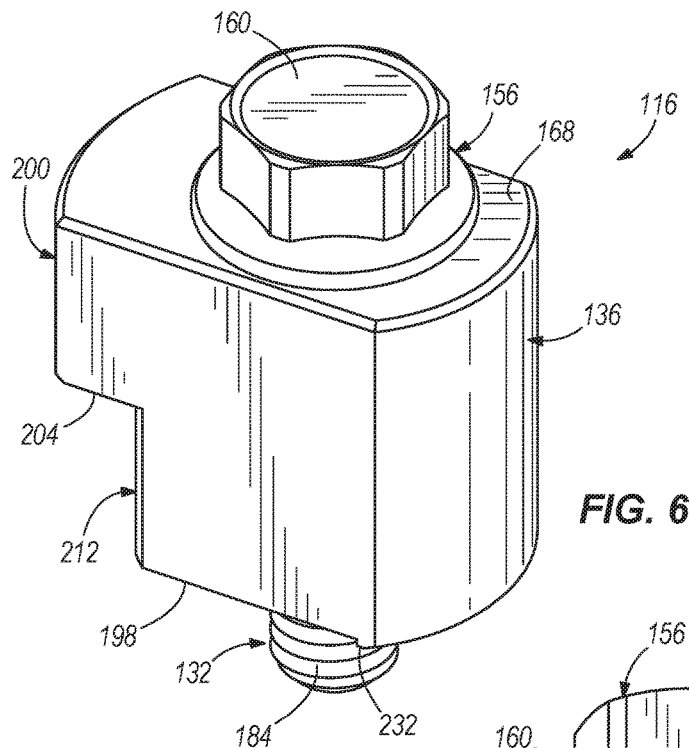
FIG. 6 is a top perspective view of one of the coupling members shown in FIG. 1, in accordance with one embodiment.
Figure 7:
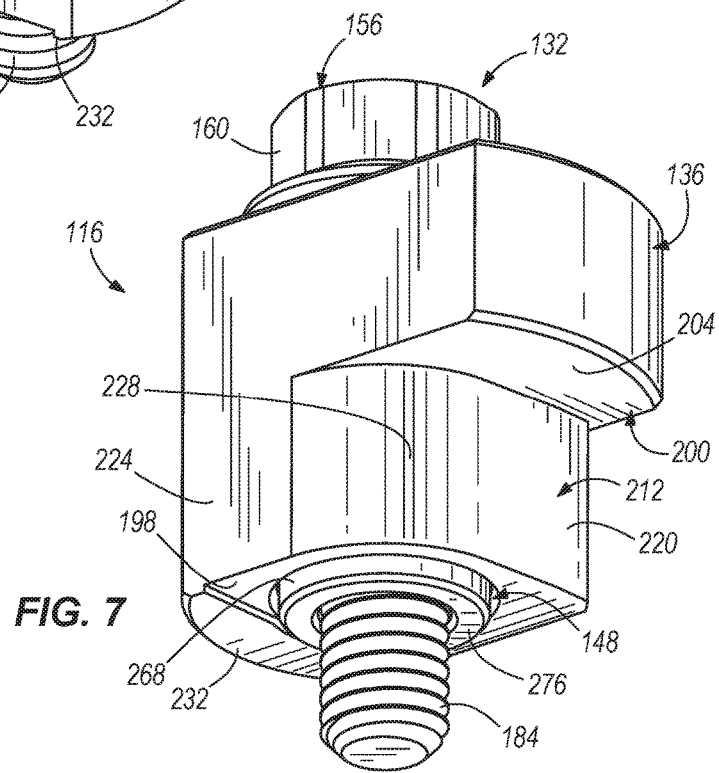
FIG. 7 is a bottom perspective view of the coupling member shown in FIG. 6, in accordance with one embodiment.
Figure 8:
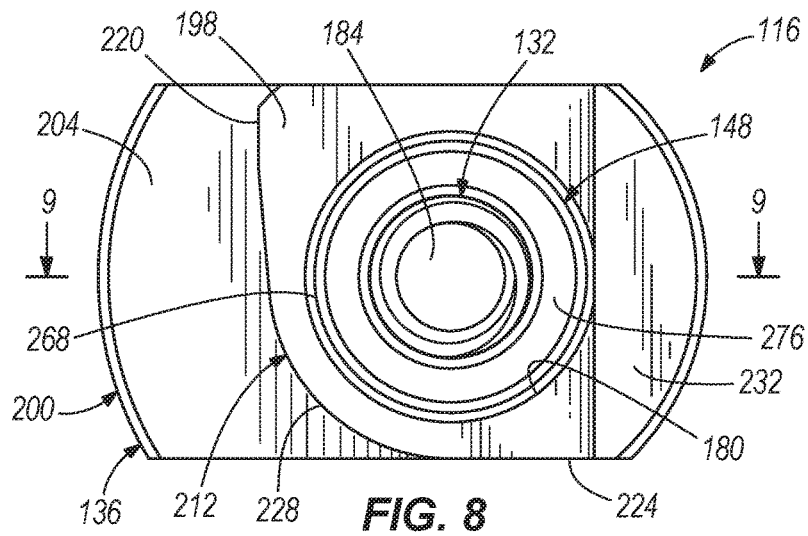
FIG. 8 is a bottom view of the coupling member shown in FIG. 6, in accordance with one embodiment.

Referring now to FIGS. 4 and 5, the coupling member 116 is adapted to rotate between a coupled condition (see FIG. 4) and an uncoupled condition (see FIG. 5). In the illustrated exemplary embodiment, the coupling member 116 is configured to rotate in a clockwise direction to move the coupling member 116 into the coupled condition and is configured to rotate in a counterclockwise direction to move the coupling member 116 into the uncoupled condition. Alternatively, the coupling member 116 may be configured to rotate in a counterclockwise direction to move the coupling member 116 into the coupled condition and may be configured to rotate in a clockwise direction to move the coupling member 116 into the uncoupled condition.

With continued reference to FIGS. 4 and 5 and further reference to FIGS. 6-9, operation of the coupling member 116 will be described and, more particularly, operation of the coupling member 116 as it moves between the coupled and uncoupled conditions.

To move the coupling member 116 from the uncoupled condition to the coupled condition, a user engages the tool coupling 160 with a tool having a complementary configuration and rotates the shaft 132 in a clockwise direction. When the coupling member 116 is in the uncoupled condition and the shaft 132 begins to rotate in a clockwise direction, the side surface 212 of the coupling member 116 engages the side surface 216 of the base 92 (if it was not already engaged) to create a friction force between those two engaging surfaces 212, 216. As long as the friction force between the two engaging surfaces 212, 216 is greater than a friction force between the shaft 132 and the engagement member 136, the shaft 132 will rotate within the cavity 180 relative to the engagement member 136. A friction force between the shaft 132 and engagement member 136 may be comprised, at least in part, of friction created between the first resilient member 140 and the interior surface 176 of the cavity 180 and friction between the bottom surface 164 of the enlarged head 156 and the top surface 168 of the engagement member 136. As the shaft 132 rotates, the threaded end 184 of the shaft 132 threads further into the tool carrier 32, which causes a downward force on the engagement member 136 by the enlarged head 156 and an upward force on the bottom surface 276 of the plunger 148. This upward force of the plunger 148 compresses the biasing member 144 between the plunger 148 and the shoulder 194 of the engagement member 136, thereby pressing the bottom surface 164 of the enlarged head 156 more into the top surface 168 of the engagement member 136. This increases the friction force between the shaft 132 and the engagement member 136 and eventually this friction force will exceed the friction force between the side surface 212 of the engagement member 136 and the side surface 216 of the base 92. When the friction force between the shaft 132 and engagement member 136 exceeds the friction force between the side surfaces 212, 216, the engagement member 136 rotates with the shaft 132 and the side surface 212 of the engagement member 136 cams, rides, rolls, or slides against the side surface 216 of the base 92. The arcuate portion 228 of the side surface 212 assists with the rolling movement of the side surface 212 of the engagement member 136 against the base 92. The engagement member 136 rotates with the shaft 132 until the first stop member 220 engages the side surface 216 of the base 92. The projection 200 is now positioned over the top surface 208 of the base 92. Since the first stop member 220 is a generally flat surface, the amount of force required to overcome the friction force created between the first stop member 220 and the side surface 216 of the base 92 is too great and could not be achieved by rotating the shaft 132. With the engagement member 136 in this fixed position, the shaft 132 may continue to rotate relative to the engagement member 136 to further draw down the projection 200 of the engagement member 136 onto the top surface 208 of the base 92. This additional rotation of the shaft 132 also further presses the plunger 148 upward to further compress the biasing member 144. The shaft 132 rotates until a desired quantity of coupling force is created between the coupling member 116 and the base 92. The coupling member 116 is now in the coupled condition illustrated in FIG. 4.

To move the coupling member 116 from the coupled condition to the uncoupled condition, a user again engages the tool coupling 160 with a tool having a complementary configuration and rotates the shaft 132 in a counterclockwise direction to decrease the amount of coupling force between the projection 200 of the engagement member 136 and the top surface 208 of the base 92. When this coupling force is greater than the amount of friction force between the shaft 132 and the engagement member 136, the shaft 132 will rotate relative to the engagement member 136. A friction force between the shaft 132 and engagement member 136 may be comprised, at least in part, of friction created between the first resilient member 140 and the interior surface 176 of the cavity 180 and friction between the bottom surface 164 of the enlarged head 156 and the top surface 168 of the engagement member 136. Compression of the biasing member 144 between the plunger 148 and the shoulder 194 of the cavity 180 provides a lifting force to the engagement member 136 such that when the downward force applied to the engagement member 136 by the enlarged head 156 of the shaft 132 decreases, the biasing force lifts the engagement member 136 upward away from the base 92. The coupling force between the projection 200 and the top surface 208 of the base 92 will eventually be less than the friction force between the shaft 132 and the engagement member 136 at which point the engagement member 136 will rotate with the shaft 132. The side surface 212 of the engagement member 136 will cam, ride, roll, or slide against the side surface 216 of the base 92 until the second stop member 224 of the side surface 212 engages the side surface 216 of the base 92. The projection 200 is now moved out from above the top surface 208 of the base 92. Since the second stop member 224 is a generally flat surface, the amount of force required to overcome the friction force created between the second stop member 224 and the side surface 216 of the base 92 is too great and could not be achieved by turning the shaft 132. With the engagement member 136 in this fixed position, the shaft 132 may continue to rotate relative to the engagement member 136 to further move up or loosen the engagement member 136. The coupling member 116 is now in the uncoupled condition illustrated in FIG. 5 and the tool support 48 may be adjusted or removed as desired.

It should be understood that the use of any orientation or directional terms herein such as, for example, "top", "bottom", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the coupling member may be utilized in any orientation and use of terms such as "top", "bottom", "side", etc., are utilized to correspond to the exemplary orientation of the coupling member illustrated in the drawings. The use of these terms in association with the coupling member is not intended to limit the coupling member to a single orientation or to limit the coupling member in any manner.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A coupling member comprising:
   a shaft;
   an engagement member defining a cavity there through and including a projection, wherein the shaft is at least partially positioned within the cavity and extends through the cavity, and wherein the shaft is adapted to rotate relative to the engagement member;
   a plunger at least partially positioned within the cavity and moveable relative to the engagement member; and
   a biasing member at least partially positioned within the cavity between the plunger and the engagement member.

2. The coupling member of claim 1, wherein the shaft includes an enlarged head on a first end thereof and threads on a second end thereof, and wherein the enlarged head engages a first surface of the engagement member and the threads extend out of the cavity beyond a second surface of the engagement member opposite the first surface.

3. The coupling member of claim 1, wherein the engagement member includes a side surface, and wherein the side surface includes a first stop member, a second stop member, and an arcuate portion between the first and second stop members, and wherein the first stop member is generally flat and the second stop member is generally flat.

4. The coupling member of claim 1, wherein the engagement member includes a bottom surface and a protrusion, wherein the bottom surface defines an end of the cavity in the engagement member, and wherein the protrusion extends from the bottom surface and the plunger extends out of the cavity beyond the bottom surface.

5. The coupling member of claim 1, wherein a shoulder is defined in the cavity of the engagement member and the biasing member is positioned between and engages the shoulder and the plunger.

6. The coupling member of claim 5, wherein rotation of the shaft in a first direction compresses the biasing member between the shoulder and the plunger, and wherein rotation of the shaft in a second direction opposite the first direction decompresses the biasing member between shoulder and the plunger.

7. The coupling member of claim 1, wherein the coupling member further comprises
   a first resilient member coupled to the shaft and adapted to engage a first interior surface of the cavity, and
   a second resilient member coupled to the plunger and adapted to engage a second interior surface of the cavity.

* * * * *